United States Patent
Boyer et al.

(10) Patent No.: US 11,073,103 B2
(45) Date of Patent: Jul. 27, 2021

(54) ENCAPSULATED FLOW MIXER STIFFENER RING

(71) Applicant: PRATT & WHITNEY CANADA CORP., Longueuil (CA)

(72) Inventors: Philippe Boyer, Saint-Remi (CA); Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 282 days.

(21) Appl. No.: 16/250,325

(22) Filed: Jan. 17, 2019

(65) Prior Publication Data

US 2019/0249620 A1 Aug. 15, 2019

Related U.S. Application Data

(60) Provisional application No. 62/630,366, filed on Feb. 14, 2018.

(51) Int. Cl.
*F02K 1/38* (2006.01)
*F02K 1/78* (2006.01)

(52) U.S. Cl.
CPC ............... *F02K 1/386* (2013.01); *F02K 1/78* (2013.01)

(58) Field of Classification Search
CPC ......... B64D 33/04; B64D 33/06; F01D 25/30; F02K 1/38; F02K 1/386; F02K 1/46; F02K 1/48; F02K 1/52; F02K 1/78; F05D 2250/611
See application file for complete search history.

(56) References Cited

U.S. PATENT DOCUMENTS

| | | | |
|---|---|---|---|
| 8,739,513 B2 | 6/2014 | Lefebvre et al. | |
| 9,284,915 B2 | 3/2016 | Lefebvre et al. | |
| 9,745,919 B2 | 8/2017 | Di Paola et al. | |
| 2008/0166227 A1* | 7/2008 | Sheaf | F02K 3/075 415/200 |
| 2011/0036068 A1* | 2/2011 | Lefebvre | F02K 1/80 60/262 |
| 2013/0115076 A1 | 5/2013 | Bouchard et al. | |
| 2013/0177410 A1 | 7/2013 | Eleftheriou et al. | |
| 2015/0354410 A1 | 12/2015 | Budnick et al. | |
| 2016/0153398 A1 | 6/2016 | Lefebvre et al. | |
| 2018/0119639 A1* | 5/2018 | Wells | F02K 1/09 |

OTHER PUBLICATIONS

European Search Report issued in counterpart application No. 19157193.4 dated Oct. 16, 2019.

* cited by examiner

*Primary Examiner* — Scott J Walthour
(74) *Attorney, Agent, or Firm* — Norton Rose Fulbright Canada LLP

(57) ABSTRACT

An exhaust mixer arrangement for a gas turbine engine comprises an exhaust cone, a lobed exhaust mixer surrounding at least a portion of the exhaust cone and a cover mounted to an outer surface of the exhaust cone. The cover and the outer surface of the exhaust cone define a dead-end cavity for receiving a stiffener ring. A plurality of circumferentially spaced-apart struts interconnect at least a number of lobes of the lobed exhaust mixer to the stiffener ring.

15 Claims, 3 Drawing Sheets

ENCAPSULATED FLOW MIXER STIFFENER RING

RELATED APPLICATION

This application claims priority from U.S. Provisional Patent Application No. 62/630,366 filed Feb. 14, 2018, the entire contents of which are incorporated by reference herein.

TECHNICAL FIELD

The application relates generally to aircraft gas turbine engines and, more particularly, to exhaust mixers thereof.

BACKGROUND OF THE ART

In turbofan gas turbine engines, high velocity exhaust gases from the turbofan core is mixed with low velocity air from the bypass duct, and this mixed air is then exhausted from the engine. Such turbofan engines generally use exhaust mixers in order to increase the mixing of the high and low velocity exhaust gas flows. Exhaust mixers may experience thermal variation and/or radial deflection due to exposure to the high and low velocity flows. In addition, exhaust mixers may be prone to vibrations, which have negative consequences for the surrounding hardware. As such, it is generally desirable to increase the stiffness or rigidity of the exhaust mixer. Various configurations of exhaust mixers have been used to date in order to try to increase the stiffness or reduce deflection thereof. However, most of the prior art methods or configurations involve significant drawbacks.

Therefore, there remains a need for an improved exhaust mixer for a gas turbine engine.

SUMMARY

In one aspect, there is provided a gas turbine engine exhaust mixer comprising a body defining a plurality of circumferentially distributed alternating inner and outer lobes, and a stiffener ring disposed outside of the engine gaspath and connected to the inner lobes via struts extending radially inwardly through slots defined in an inner wall of the engine gaspath, the stiffener ring being disposed in a dead-end cavity (i.e. a zone through which gas does not flow).

According to another aspect, the stiffener ring is capped with a cover plate in the form of an inner ring, the cover plate being integrated as a section of an inner flow boundary wall of the main gaspath. Elongated slots aligned with the struts are incorporated in the inner ring in order to allow the assembly.

In another aspect, there is provided an exhaust mixer arrangement configured to be mounted at an exhaust of a gas turbine engine, comprising: an exhaust cone; a lobed exhaust mixer surrounding at least a portion of the exhaust cone; a cover mounted to an outer surface of the exhaust cone, the cover and the outer surface of the exhaust cone defining a dead-end cavity therebetween; a stiffener ring disposed in the dead-end cavity; and a plurality of circumferentially spaced-apart struts interconnecting at least a number of lobes of the lobed exhaust mixer to the stiffener ring.

In another aspect, there is provided a gas turbine engine comprising: a main gaspath having an inner flow boundary wall and an outer flow boundary wall; a turbine exhaust case inner body having an outer surface defining a portion of the inner flow boundary wall of the main gaspath; a lobed exhaust mixer surrounding at least a portion of the turbine exhaust case inner body and defining a portion of the outer flow boundary wall of the main gaspath; an annular cover plate mounted to the turbine exhaust case inner body; an annulus between the annular cover plate and an outer surface of the turbine exhaust case inner body; a stiffener ring disposed in the annulus underneath the annular cover plate; and a series of circumferentially spaced-apart struts interconnecting at least a number of lobes of the lobed exhaust mixer to the stiffener ring, the struts extending radially through corresponding slots defined in the annular cover plate.

According to a still further aspect, there is provided a gas turbine engine comprising: an engine casing enclosing a compressor section, a combustor and a turbine section defining a main gaspath serially extending therethrough, the main gaspath having an inner flow boundary wall and an outer flow boundary wall, the gas turbine engine further comprising: a turbine exhaust case inner body having an outer surface defining a portion of the inner flow boundary wall of the main gaspath; an exhaust mixer connected to an aft end of the engine casing and surrounding at least a portion of the turbine exhaust case inner body, the exhaust mixer having a mixer body forming a portion of the outer flow boundary wall of the main gaspath and defining a plurality of circumferentially distributed alternating inner and outer lobes; an annular cover plate mounted to an outer surface of the turbine exhaust case inner body, the annular cover plate having a radially outer surface forming a portion of the inner flow boundary wall of the main gaspath; a stiffener ring located radially between the annular cover plate and the outer surface of the turbine exhaust case inner body; and a series of circumferentially spaced-apart struts which radially extend through the main gaspath between at least some of the inner lobes and the stiffener ring, the struts extending though individual slots defined in the annular cover plate.

BRIEF DESCRIPTION OF THE DRAWINGS

Reference is now made to the accompanying figures in which.

DETAILED DESCRIPTION

Figure 1:
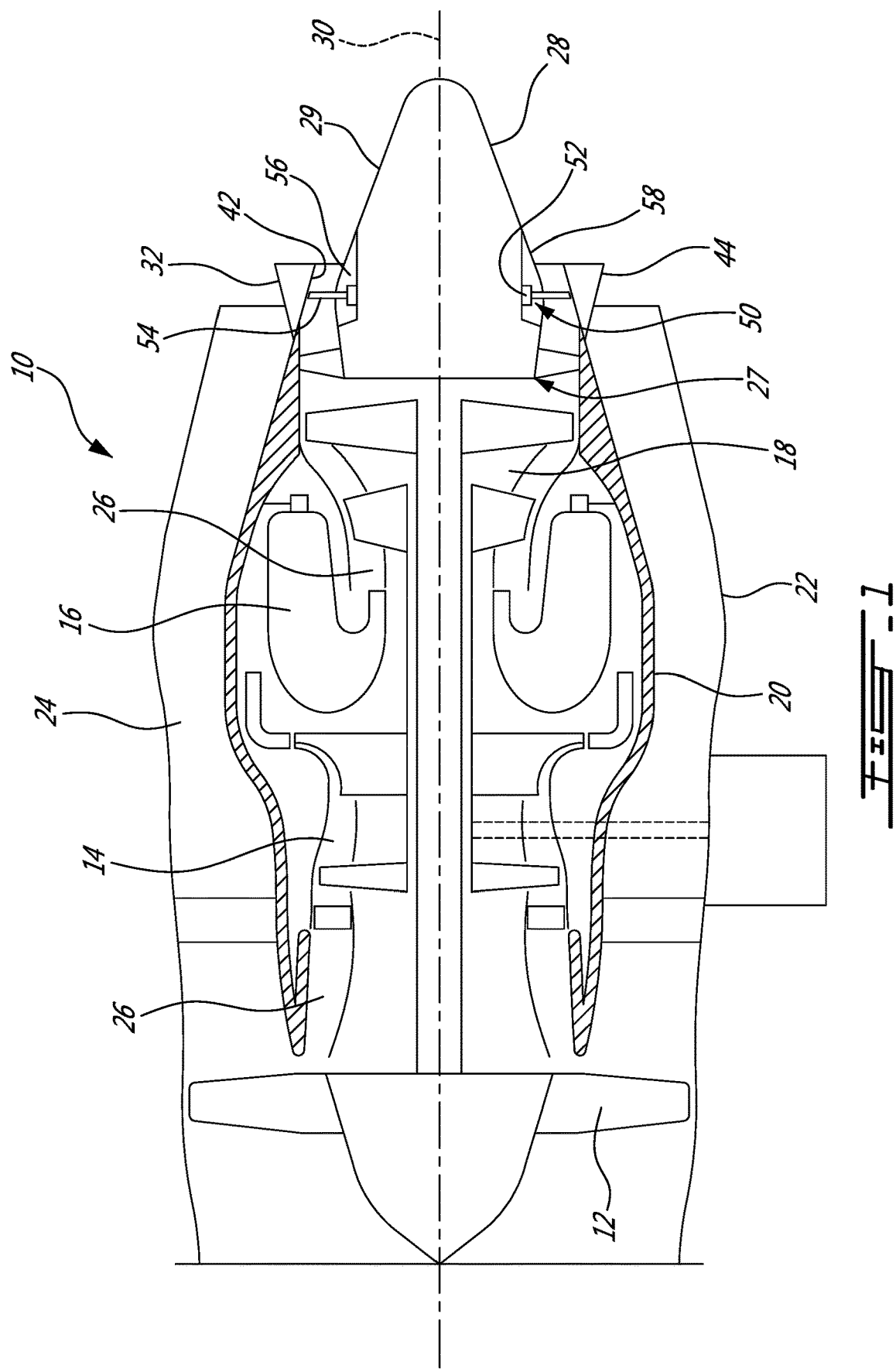
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a core engine casing 20 which encloses the turbo machinery of the engine, and an outer casing 22 disposed radially outwardly of the core engine casing 20 such as to define an annular bypass passage 24 therebetween. The air propelled by the fan 12 is split into a first portion which flows around the core engine casing 20 within the bypass passage 24, and a second portion which flows through the core of the engine via a main gas path 26, which is circumscribed by the core engine casing 20 and allows the flow to circulate through the multistage compressor 14, combustor 16 and turbine section 18 as described above.

The turbine section 18 comprises a turbine exhaust case inner body 27 including an exhaust cone 28 centered about a longitudinal axis 30 of the engine 10. The turbine exhaust case inner body has an outer surface 29, which defines an aft portion of an inner flow boundary wall of the main gaspath 26 so that the combustion gases flow thereover.

An annular exhaust mixer 32 surrounds at least a portion of the turbine exhaust case inner body 27. The mixer 32 is connected at a front end thereof to an aft portion of the core engine casing 20. The annular exhaust mixer 32 at least partially acts as an extension of a rearmost portion of the outer wall of the main gaspath 26 and a rearmost portion of the inner wall of the bypass passage 24. The hot combustion gases from the main gaspath 26 and the cooler air from the bypass passage 24 are thus mixed together by the mixer 32 such as to produce an engine exhaust yielding a greater thrust.

Figure 2:
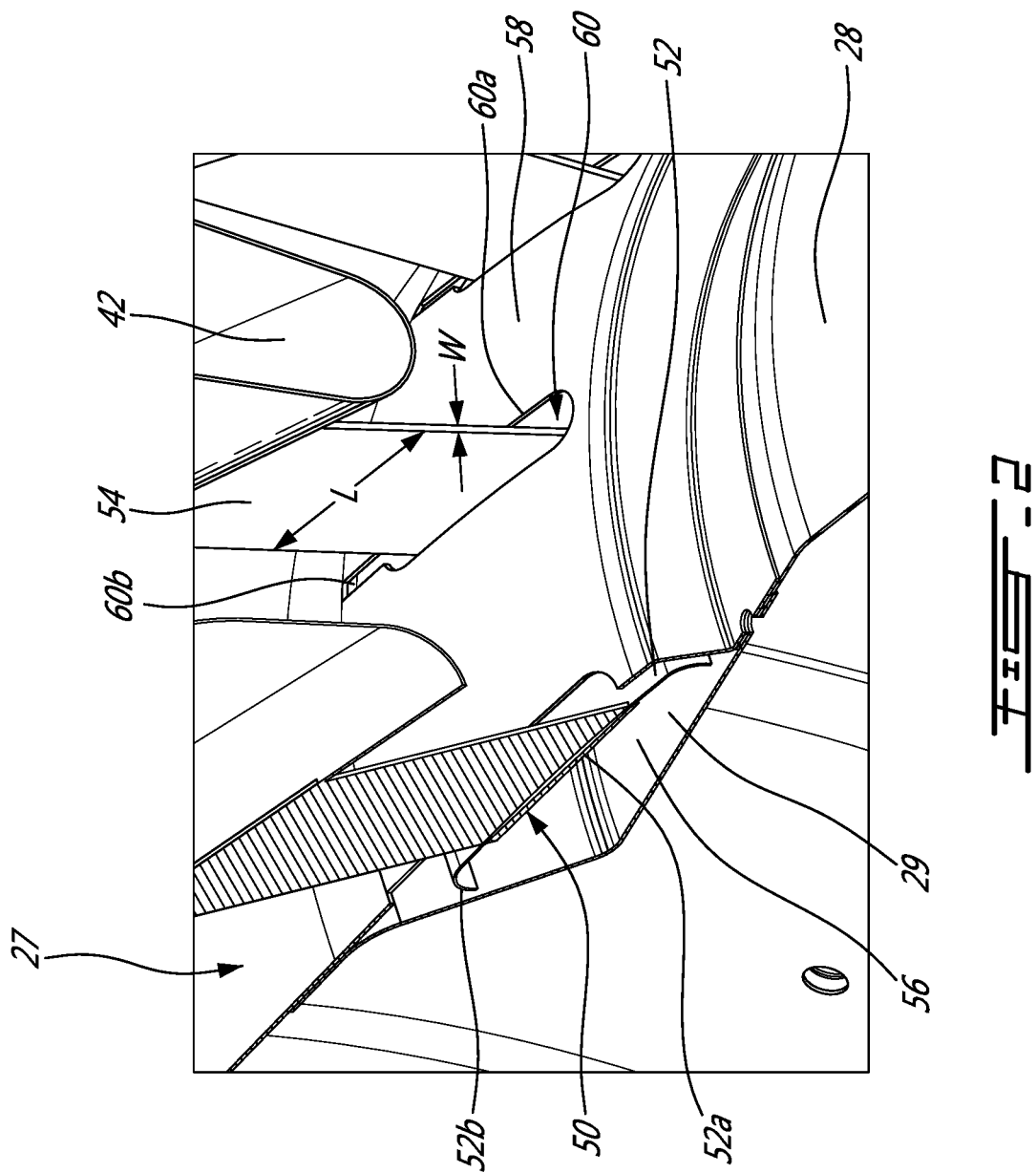
FIG. 2 is an enlarged isometric view of a portion of an exhaust mixer having a support member connected to mixer lobes thereof, in accordance with one embodiment of the present disclosure.
Figure 3:
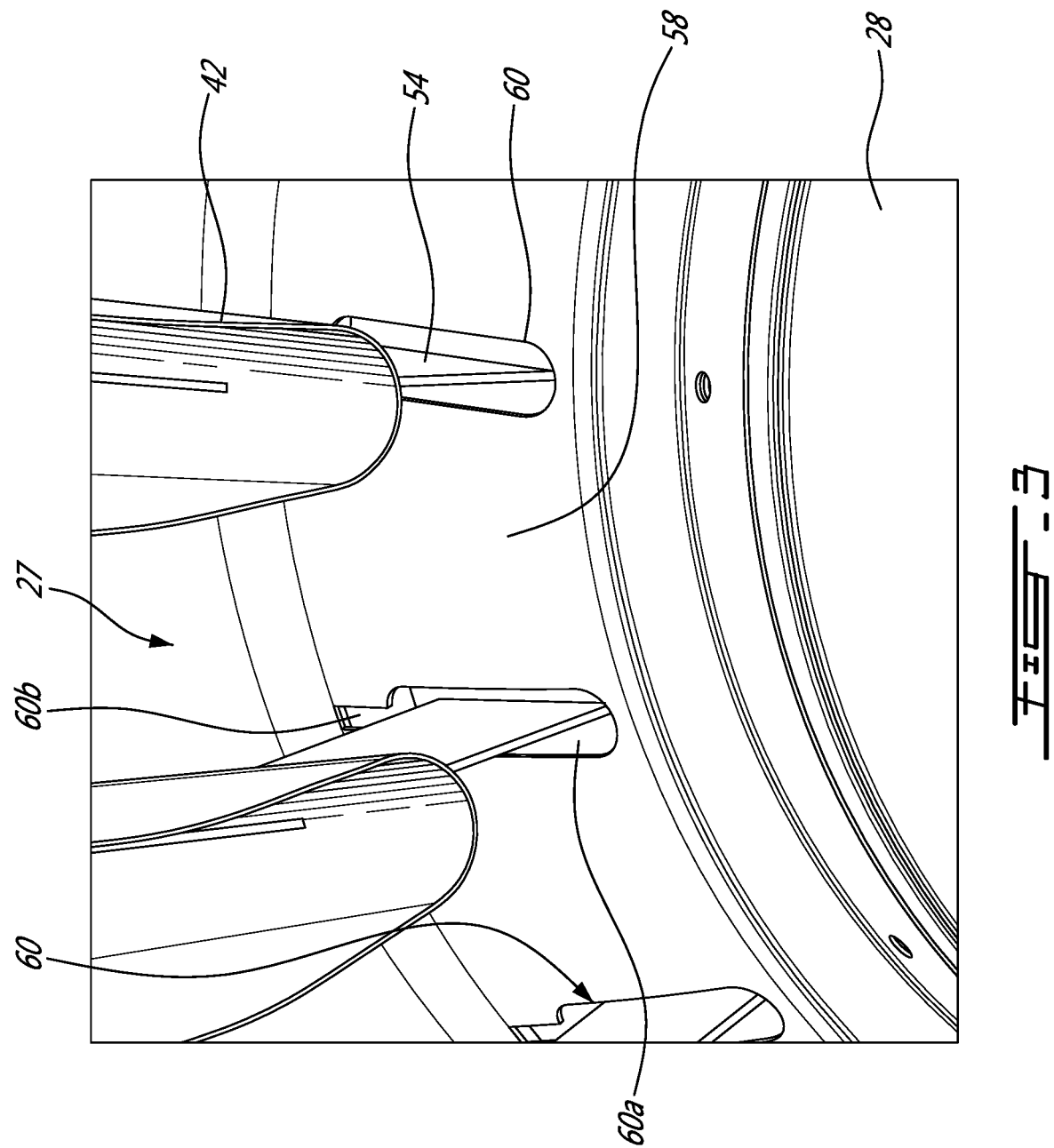
FIG. 3 is a rear perspective view of a portion of the exhaust mixer shown in FIG. 2.

Referring concurrently to FIGS. 1-3, the mixer 32 includes an annular wall or body defining a plurality of circumferentially distributed lobes extending rearwardly from an upstream end to a downstream end, i.e. a trailing edge. The mixer lobes include alternating inner radial lobes 42 and outer radial lobes 44, with the outer lobes 44 extending into the bypass passage 24 and the inner lobes 42 extending into the main engine core gaspath 26.

The lobed mixer 32 is solely connected to and supported at the upstream end thereof by the aft end of the core engine casing 20. In other words, the mixer 32 is cantilevered from the engine casing 20. In order to provide additional support to the mixer 32, the mixer 32 includes a support member 50 connected to at least some of the lobes thereof, as shown in FIGS. 2 and 3. The support member 50 comprises an annular stiffener ring 52, which is radially spaced apart (inwardly) from the inner lobes 42, and a series of circumferentially spaced apart and radially extending mixer struts 54 which interconnect the stiffener ring 52 and the inner lobes 42. The stiffener ring 52 provides stiffness to the mixer lobes while structurally decoupling them from the turbine exhaust case inner body 27 to prevent the generation of thermal stress in operation.

As shown in FIGS. 2 and 3, the stiffener ring 52 is suspended from the inner lobes 42 by the struts 54. Accordingly, the stiffener ring 52 is free to move relative to the turbine exhaust case inner body 27. Such a floating ring arrangement where the stiffener ring 52 is decoupled from the turbine exhaust case inner structure (including the exhaust cone 28) may be used to prevent the transmission of loads to the mixer lobes due thermal growth differential between turbine exhaust case inner structure and the mixer 32.

In one embodiment, the support member 50 may be connected to each of the inner lobes 42, but in an alternate embodiment, the support member 50 may include fewer struts 54 than there are inner lobes 42 of the mixer 32, and thus only some of the inner lobes 42 have support struts 54 extending from the radially inner end thereof such as to directly connect these lobes 42 to the stiffener ring 52.

The struts 54 may be welded or brazed to the inner lobes 42, or alternatively may be fastened thereto using bolts, rivets or other suitable fasteners, for example. In the embodiment shown, the mixer struts 54 are axially located upstream of the downstream end (trailing edge) of the exhaust mixer 32.

Because the struts 54 extend through main gaspath 26, the struts 54 may have a generally aerodynamic profile for limiting any obstruction of the high velocity flows passing through the main gaspath 26. As seen in FIGS. 2 and 3, the finished shape of the struts 54 is generally elongated such that it extends a longitudinal length L in the direction of flow through the main gaspath 26 that is greater than the narrower transversal width W in a direction perpendicular to the direction of the flow through the main gaspath 26. In the illustrated embodiment the struts have a flat blade profile. The longitudinal length L of the struts 54 is thus significantly greater than the transversal width W, such that the transversal width W is minimized in order to reduce any turbulence caused in the flow through the main gas path 26 and to reduce back pressure.

Still referring to FIGS. 2 and 3, the stiffener ring 52 extends circumferentially about the longitudinal axis 30 of the engine 10. In the embodiment shown, the stiffener ring 52 comprises an annular longitudinal portion 52a and annular inwardly radially curved ends 52b on either axial side of the longitudinal portion 52a, such that the stiffener ring 52 forms a substantially inverted U-shaped cross-sectional profile. This U-shape (or C-shape) of the stiffener ring 52 helps to increase the rigidity thereof. In other embodiments, the stiffener ring 52 may have various annular shapes.

Still further referring to FIGS. 2 and 3, it can be appreciated that the stiffener ring 52 is disposed outside of the main gaspath 26 (e.g. radially inward of the gaspath). The stiffener ring 52 floats with respect to the turbine exhaust case inner body 27, i.e. the stiffener ring 52 at least does not directly contact the exhaust cone 28 when disposed in its resting and normal operating position. As such, the stiffener ring 52 is not fastened to the turbine exhaust case inner body 27 and, thus, is free to move, for example in a radial direction, with respect thereto.

As will be described in details hereinafter, the stiffener ring 52 is "encapsulated" so that in operation the high velocity hot combustion gases that flow through the exhaust portion of the main gaspath 26 do not flow over the stiffener ring 52. In this way, flow induced vibrations may be avoided. Indeed, having a floating ring positioned in the main gaspath or exposed to the flow of exhaust gases would result in dynamic activities resulting from the interaction between the exhaust gas flow and the stiffener ring 52. It has been found that such flow induced vibrations can result in high vibration stresses and negatively affect the structural integrity of the mixer 32.

Accordingly, it is herein proposed to cap or encapsulate the stiffener ring 52 so as to shield it from the stream of gases flowing through the main gaspath 26. This may be accomplished by positioning the stiffener ring 52 in a dead-end cavity (a space that has a closed end and that does not lead anywhere) or annulus 56. The dead-end cavity 56 may be formed by mounting an annular cover plate or ring 58 over a "waterfall" step or a recess in the inner wall of the main gaspath 26. For instance, as shown in FIG. 2, the annular cover plate 58 could bridge a step formed in the inner flow boundary wall of the main gaspath 26 (e.g. in the outer surface 29 of the turbine exhaust case inner structure including the exhaust cone 28). The cover plate 58 is mounted so as to form a portion of the inner flow boundary wall of the gaspath 26 so that in operation the exhaust gases flow over an outer surface of the cover plate 58 and not over the stiffener ring 52, which is disposed thereunder.

According the embodiment shown in FIG. 2, the annular cover plate 58 is mounted to the outer surface of the turbine exhaust case inner body 27 between two axially spaced-apart sections thereof separated by a "waterfall" step. According to the illustrated example, the bottom of the dead-end cavity 56 is defined by the outer surface 29 of the exhaust cone 28. The dead-end cavity 56 is not in fluid flow communication with the hollow internal volume of the exhaust cone 28. In this way, flow of exhaust gases into the hollow interior of the exhaust cone 28 is prevented. That would not be the case if the stiffener ring was simply disposed in the internal volume of the exhaust cone 28. The dead-end cavity configuration resulting from the annular cover plate 58 and the outer surface of the turbine exhaust case inner body 27 avoids gas path ingestion or secondary air leakages through the engine exhaust cone. It also allows for smooth transition for the exhaust gas flow, thereby reducing possible disturbance in the high velocity flow discharged from the main gaspath.

It is understood that various arrangements are contemplated to create the dead-end cavity 56 for receiving the stiffener ring 52.

As shown in FIGS. 2 and 3, circumferentially spaced-apart slots 60 are defined in the annular cover plate 58 of the dead-end cavity 56 for receiving respective struts 54. The mixer struts 54 extend from the inner lobes 42 radially inwardly through the main gaspath 26 and the slots 60 into the dead-end cavity 56 where the struts 54 are connected to the stiffener ring 52. The slots 60 are sized to accommodate the support struts 54 therethrough. In the illustrated embodiment, the slots 60 have an axially elongated profile including a main oblong portion 60a and a thinner and axially shorter entry guiding portion 60b. The entry portion 60b has an axially open end in the upstream edge of the annular cover plate 58 to allow the annular cover 58 to be axially positioned over the stiffener ring 52. The entry portion 60b leads to the larger main oblong portion 60a in which the associated strut 54 is accommodated when the cover plate 58 has been axially inserted to its final position over the stiffener ring 52.

As mentioned, the exhaust mixer 32 is solely connected to the engine 10 at the aft end 20b of the core engine casing 20, and so, the exhaust mixer is effectively cantilevered from the core engine casing 20. This cantilevered configuration allows the lobes 42, 44 of the exhaust mixer 32 to vibrate at one or more modes in the engine operating frequency range, while remaining relatively stiff and without the stiffening ring or the support struts contacting the turbine exhaust case inner body (including the exhaust cone 28). In addition, the thermal variations in the exhaust mixer 32 due to the high and low velocity flows through the main gaspath 26 and the bypass passage 24 may cause axial and radial displacements in the mixer 32, which can accordingly be absorbed by the exhaust mixer 32. Moreover, the downstream end of the mixer 32, which would otherwise be prone to deflection, is reinforced by the stiffener ring 52 which serves to increase the rigidity of the exhaust mixer 32 and thus inhibit movement at the downstream end 38 thereof. By joining all (or at least some of) the inner lobes 42 together with a stiffener ring 52, any movement of the exhaust mixer 32 is reduced, as are the vibrations thereof. In addition, by providing a stiffener ring 52 which is independent of the turbine exhaust case inner body, i.e. it is free to move relative thereto such as to absorb any vibrations or thermal growth mismatches therebetween, the stiffener ring 52 is able to accommodate any axial or radial displacements due to such thermal variations. As such, the exhaust mixer 32 provides enhanced rigidity and may accommodate thermal variations, vibrations and other displacements, as required.

Moreover by positioning the stiffener ring 52 in a dead-end cavity 56 outside of the main gaspath 26, no flow induced vibrations are directly transmitted to the stiffener ring 52 by the turbine exhaust gases. In this way it is possible to avoid potential fluid structure interactions between the stiffener ring and the gaspath flow. As such, noise and vibrations may be at least reduced. Furthermore, as mentioned, the struts 54 may be aerodynamically-shaped so as to reduce any disturbances caused thereby to the fluid flow in the main gas path 26 and the transmission of vibrations to the mixer support member 50. As such, the exhaust mixer 32 includes a support member 50 which is configured to minimize any disturbances caused thereby to the fluid flow passing through the main gaspath 26 and which is less subject to vibrations induced by the turbine exhaust flow.

The above description is meant to be exemplary only, and one skilled in the art will recognize that changes may be made to the embodiments described without departing from the scope of the invention disclosed. For example, the invention may be used with various types of bypass gas turbine engines where two flow streams are mixed. Still other modifications which fall within the scope of the present invention will be apparent to those skilled in the art, in light of a review of this disclosure, and such modifications are intended to fall within the appended claims.

The invention claimed is:

1. An exhaust mixer arrangement configured to be mounted at an exhaust of a gas turbine engine, comprising:
   an exhaust cone;
   a lobed exhaust mixer surrounding at least a portion of the exhaust cone;
   a cover mounted to an outer surface of the exhaust cone, the cover and the outer surface of the exhaust cone defining a dead-end cavity therebetween, the cover including an annular cover plate having circumferentially spaced-apart slots defined therein;
   a stiffener ring disposed in the dead-end cavity; and
   a plurality of circumferentially spaced-apart struts interconnecting a plurality of lobes of the lobed exhaust mixer to the stiffener ring, the plurality of circumferentially spaced-apart struts extending through the circumferentially spaced-apart slots, the circumferentially spaced-apart slots having axially open ends defined in an upstream edge of the annular cover plate.

2. The exhaust mixer arrangement defined in claim 1, wherein the cover has an outer surface defining a portion of an inner flow boundary wall of a gas path configured for receiving exhaust gases from a turbine section of the gas turbine engine, the cover shielding the stiffener ring from the gas path.

3. The exhaust mixer arrangement defined in claim 1, wherein the cover is mounted over a step formed on the outer surface of the exhaust cone.

4. The exhaust mixer arrangement defined in claim 1, where in the exhaust cone has a hollow internal volume, and wherein the dead-end cavity is disposed outside of the hollow internal volume.

5. The exhaust mixer arrangement defined in claim 1, wherein the circumferentially spaced-apart slots have an axially elongated profile including a main oblong portion and an entry guiding portion, the entry guiding portion having a width which is less than a width of the main oblong portion, the entry guiding portion further having an axial length which is less than an axial length of the main oblong portion.

6. A gas turbine engine comprising:
- a main gaspath having an inner flow boundary wall and an outer flow boundary wall;
- a turbine exhaust case inner body having an outer surface defining a portion of the inner flow boundary wall of the main gaspath;
- a lobed exhaust mixer surrounding at least a portion of the turbine exhaust case inner body and defining a portion of the outer flow boundary wall of the main gaspath;
- an annular cover plate mounted to the turbine exhaust case inner body;
- a cavity between the annular cover plate and the outer surface of the turbine exhaust case inner body;
- a stiffener ring disposed in the cavity radially inward from the annular cover plate relative to a longitudinal axis of the gas turbine engine; and
- a series of circumferentially spaced-apart struts interconnecting a plurality of lobes of the lobed exhaust mixer to the stiffener ring, the series of circumferentially spaced-apart struts extending radially through corresponding slots defined in the annular cover plate, the series of circumferentially spaced-apart slots having axially open ends defined in an upstream edge of the annular cover plate.

7. The gas turbine engine defined in claim 6, wherein the annular cover plate has an outer surface defining a portion of the inner flow boundary wall of the main gaspath, the annular cover plate shielding the stiffener ring from the main gaspath.

8. The gas turbine engine defined in claim 6, wherein the annular cover plate is mounted over a step formed in the turbine exhaust case inner body.

9. The gas turbine engine defined in claim 6, wherein the turbine exhaust case inner body includes an exhaust cone having a hollow internal volume, and wherein the cavity is disposed outside of the hollow internal volume.

10. The gas turbine engine defined in claim 6, wherein the slots have an axially elongated profile including a main oblong portion and an entry guiding portion, the entry guiding portion having a width which is less than a width of the main oblong portion, the entry guiding portion further having an axial length which is less than an axial length of the main oblong portion.

11. A gas turbine engine comprising: an engine casing enclosing a compressor section, a combustor and a turbine section defining a main gaspath serially extending therethrough, the main gaspath having an inner flow boundary wall and an outer flow boundary wall, the gas turbine engine further comprising:
- a turbine exhaust case inner body having an outer surface defining a portion of the inner flow boundary wall of the main gaspath;
- an exhaust mixer connected to an aft end of the engine casing and surrounding at least a portion of the turbine exhaust case inner body, the exhaust mixer having a mixer body forming a portion of the outer flow boundary wall of the main gaspath and defining a plurality of circumferentially distributed alternating inner and outer lobes;
- an annular cover plate mounted to the outer surface of the turbine exhaust case inner body, the annular cover plate having a radially outer surface forming a portion of the inner flow boundary wall of the main gaspath;
- a stiffener ring located radially between the annular cover plate and the outer surface of the turbine exhaust case inner body; and
- a series of circumferentially spaced-apart struts which radially extend through the main gaspath between at least some of the inner lobes and the stiffener ring, the series of circumferentially spaced-apart struts extending though individual slots defined in the annular cover plate, the series of circumferentially spaced-apart slots having axially open ends defined in an upstream edge of the annular cover plate.

12. The gas turbine engine defined in claim 11, wherein the annular cover plate cooperates with the outer surface of the turbine exhaust case inner body to define a dead-end cavity therebetween, the stiffener ring received in the dead-end cavity.

13. The gas turbine engine defined in claim 11, wherein the annular cover plate is mounted over a step formed in the turbine exhaust case inner body.

14. The gas turbine engine defined in claim 12, wherein the turbine exhaust case inner body includes an exhaust cone having a hollow internal volume, and wherein the dead-end cavity is disposed outside of the hollow internal volume.

15. The gas turbine engine defined in claim 11, wherein the slots have an axially elongated profile including a main oblong portion and an entry guiding portion, the entry guiding portion having a width which is less than a width of the main oblong portion, the entry guiding portion further having an axial length which is less than an axial length of the main oblong portion.

* * * * *